(12) United States Patent
Brust et al.

(10) Patent No.: US 7,505,835 B2
(45) Date of Patent: Mar. 17, 2009

(54) SYSTEM AND METHOD FOR PRODUCING FLIGHT PATHWAY

(75) Inventors: Clifford S. Brust, Beaver Creek, OH (US); Gary Evans, Troy, OH (US)

(73) Assignee: L-3 Communications Avionics Systems, Inc., Grand Rapids, MI (US)

( * ) Notice: Subject to any disclaimer, the term of this patent is extended or adjusted under 35 U.S.C. 154(b) by 776 days.

(21) Appl. No.: 10/189,814

(22) Filed: Jul. 3, 2002

(65) Prior Publication Data

US 2003/0023354 A1 Jan. 30, 2003

Related U.S. Application Data

(60) Provisional application No. 60/303,585, filed on Jul. 6, 2001.

(51) Int. Cl.
*G01C 23/00* (2006.01)
(52) U.S. Cl. .................. 701/3; 701/4; 701/18; 701/120; 701/122; 701/300; 340/945; 340/947; 340/963
(58) Field of Classification Search ..................... 701/3, 701/4, 9, 10, 11, 14, 15, 16, 120, 121, 122; 340/945, 947, 948, 950, 951, 961–964, 972, 340/975, 970–971, 980; 345/427, 428; 342/29–38
See application file for complete search history.

(56) References Cited

U.S. PATENT DOCUMENTS 3,786,505 A * 1/1974 Rennie .......................... 342/33

(Continued)

FOREIGN PATENT DOCUMENTS

DE 19 61 480 10/1970

(Continued)

OTHER PUBLICATIONS

Barrows, Andrew K. et al, Alaskan Flight Trials of a Synthetic Vision System for Instrument Landings of a Piston Twin Aircraft, Department of Aeronautics and Astronautics, Stanford University, Stanford, CA, Apr. 1999.

(Continued)

*Primary Examiner*—Gertrude Arthur Jeanglaud
(74) *Attorney, Agent, or Firm*—Van Dyke, Gardner, Linn & Burkhart, LLP

(57) ABSTRACT

A system and method for displaying a three-dimensional image of airspace includes a series of translucent, horizontal "pavers" that lie like stepping stones marking the selected flight path. In addition, the display includes a series of vertical rectangles—called "wickets"—which bracket the selected flight path. One or more of the wickets may include a graphical representation of the direction of the aircraft should be flying through the wicket. The system accommodates changes in course by generating a new flight path when instructed to do so. The new flight path is created in a way that assures continuous guidance for the pilot and sufficient time for the pilot to adjust to the new course. The display can include a compass rose which indicates the aircraft's present heading and direction of flight. The compass rose is generated from data representing a traditional two-dimensional view of a compass rose that is rotated using a graphics processor to show a three dimensional view of the compass rose in a plane that appears nearly horizontal in the three dimensional airspace image. In addition various landmarks such as airports and navigation beacons, as well as geopolitical boundaries may be included in the display.

51 Claims, 4 Drawing Sheets

U.S. PATENT DOCUMENTS

| | | | | |
|---|---|---|---|---|
| 5,357,263 | A * | 10/1994 | Fischer et al. | 345/9 |
| 5,420,582 | A | 5/1995 | Kubbat et al. | 340/974 |
| 5,745,863 | A | 4/1998 | Uhlenhop et al. | 701/14 |
| 5,797,562 | A | 8/1998 | Wyatt | 244/1 R |
| 5,798,713 | A | 8/1998 | Viebahn et al. | 340/974 |
| 5,844,504 | A | 12/1998 | Etherington | 340/973 |
| 5,920,321 | A | 7/1999 | Owen et al. | 345/427 |
| 5,923,286 | A | 7/1999 | Divakaruni | 342/357.06 |
| 5,936,552 | A | 8/1999 | Wichgers et al. | 340/963 |
| 5,936,553 | A | 8/1999 | Kabel | 340/995.14 |
| 5,995,901 | A | 11/1999 | Owen et al. | 701/202 |
| 6,005,581 | A | 12/1999 | Gjullin | 345/582 |
| 6,085,129 | A | 7/2000 | Schardt et al. | 701/14 |
| 6,107,943 | A | 8/2000 | Schroeder | 340/945 |
| 6,154,151 | A | 11/2000 | McElreath et al. | 340/970 |
| 6,320,579 | B1 * | 11/2001 | Snyder et al. | 345/419 |
| 6,496,760 | B1 * | 12/2002 | Michaelson et al. | 701/3 |
| 6,573,841 | B2 * | 6/2003 | Price | 340/963 |
| 6,907,324 | B2 | 6/2005 | Cundiff | |
| 2003/0193411 | A1 | 10/2003 | Price | |

FOREIGN PATENT DOCUMENTS

| | | | | |
|---|---|---|---|---|
| DE | 2458664 | A | * | 6/1976 |

OTHER PUBLICATIONS

Hughes, David, Avionics on Verge of Providing Full Weather, Terrain Picture, Avionic Week & Space Technology, Washington, Sep. 7, 1998.

Barrows, Andrew K. et al., Evaluation of a Perspective-View Cockpit Display for General Aviation Using GPS, Navigation: Journal of The Institute of Navigation, Stanford University, Stanford, CA, vol. 43, No. 1, Spring 1996.

Jennings, Chad et al., Synthetic Vision Displays for Instrument Landings and Traffice Awareness-Development and Flight Testing, Department of Aeronautics and Astronautics, Stanford University, Stanford, CA, 2000.

Moller, H., et al., Synthetic Vision for Enhancing Poor Visibility Flight Operations, Institute of Flight Mechanics and Flight Control, IEEE AES Systems Magazine, Mar. 1994.

Viebahn, Harro Von, The 4D-Display, IEEE AES Systems Magazine, 1998.

Barroca, L.M., et al., The Architectural Specification of an Avionic Subsystem, IEEE AES Systems Magazine, 1995.

Wilkins Jr, Robert Ryan, Use of Predictive Perspective Guidance Displays for Increased Situational Awareness, Boeing Philadelphia Crew Systems Operational Concepts Analyst, Philadelphia, PA, 2001.

* cited by examiner

SYSTEM AND METHOD FOR PRODUCING FLIGHT PATHWAY

This application claims the benefit of U.S. Provisional Application No. 60/303,585 filed Jul. 6, 2001.

FIELD OF THE INVENTION

The present invention addresses the problem of presenting a three dimensional image on a screen such as a CRT or flat panel display to an aircraft pilot showing a pathway in airspace which has been selected for a flight.

BACKGROUND OF THE INVENTION

Contemporary aircraft make extensive use of computer generated displays. Compared to earlier instrumentation, computer generated displays are easier for pilots to use and to understand, an advantage that can prove important when quick decisions must be made. One portion of such a display could be a synthetic view of the airspace through which the pilot is to fly with the pathway marked in an easy to follow manner. Such a view can be generated from flight plan data. Such a display may also include navigation information such as a compass rose and information concerning the aircraft's current heading and direction of travel.

SUMMARY OF THE INVENTION

The present invention provides a system and method for displaying a three-dimensional image of airspace that includes a series of translucent, horizontal "pavers" that lie like stepping stones marking the selected flight path. In addition, the display includes a series of vertical rectangles—called "wickets"—which bracket the selected flight path. One or more of the wickets may include a graphical representation of the direction the aircraft should be flying through the wicket. In the image the wickets and pavers are presented from the point of view of aircraft's current position. The system accommodates changes in course by generating a new flight path when instructed to do so. The new flight path is created in a way that assures continuous guidance for the pilot and sufficient time for the pilot to adjust to the new course.

Thus, according to one broad aspect of the invention, there is provided a method and system for presenting flight path information for an aircraft in a three-dimensional airspace display, wherein flight plan data is received; aircraft performance data is received; the data is processed to form flight path data; first and second symbols are generated in response to the flight path data, the first symbols showing boundaries around the flight path, and the second symbols following the flight path; and the first and second symbols are displayed in a three dimensional airspace display. As is preferred, the symbols updated and displayed from the point of view of the present position of the aircraft.

According to another aspect of the invention, there is provided a method and system for presenting flight path information for an aircraft in a three-dimensional airspace display, wherein flight plan data is received; aircraft performance data is received; the data is processed to form flight path data; first and second symbols are generated in response to the flight path data; and the symbols are displayed in a three dimensional airspace display; and wherein the step of receiving flight plan data includes receiving data corresponding to an initial flight plan, processing the data to form first flight path data, and thereafter receiving data corresponding to a second flight plan, processing the second flight plan data to form second flight path data which begins at the aircraft's current position, generating symbols in response to the second flight path data, and displaying the symbols in a three dimensional airspace display. As is preferred, the second flight path data includes an initial segment that is an unaltered continuation of the initial flight plan.

According to a further aspect of the invention, there is provided an method and associated system for carrying out the method, wherein the method A method of presenting flight path information for an aircraft in a three-dimensional airspace display, said method comprises the steps of receiving flight plan data, receiving aircraft performance data, processing the data to form flight path data, generating symbols in response to the flight path data, the symbols showing boundaries around the flight path and at least one of the symbols having associated therewith an indicator of the direction through which the aircraft should pass through the boundary depicted by the symbol, and displaying the first and second symbols in a three dimensional airspace display.

To further aid navigation in accordance with the invention, the display (in combination or separately from other features of the present invention) may include a compass rose which indicates the aircraft's present heading and direction of flight. The compass rose is generated from data representing a traditional two-dimensional view of a compass rose that is rotated using a graphics processor to show a three dimensional view of the compass rose in a plane that appears nearly horizontal in the three dimensional airspace image. In addition various landmarks such as airports and navigation beacons, as well as geopolitical boundaries may be included in the display.

The foregoing and other features of the invention are hereinafter fully described and particularly pointed out in the claims, the following description and the annexed drawings setting forth in detail one or more illustrative embodiments of the invention, such being indicative, however, of but one or a few of the various ways in which the principles of the invention may be employed.

DESCRIPTION OF PREFERRED EMBODIMENTS

Figure 1:
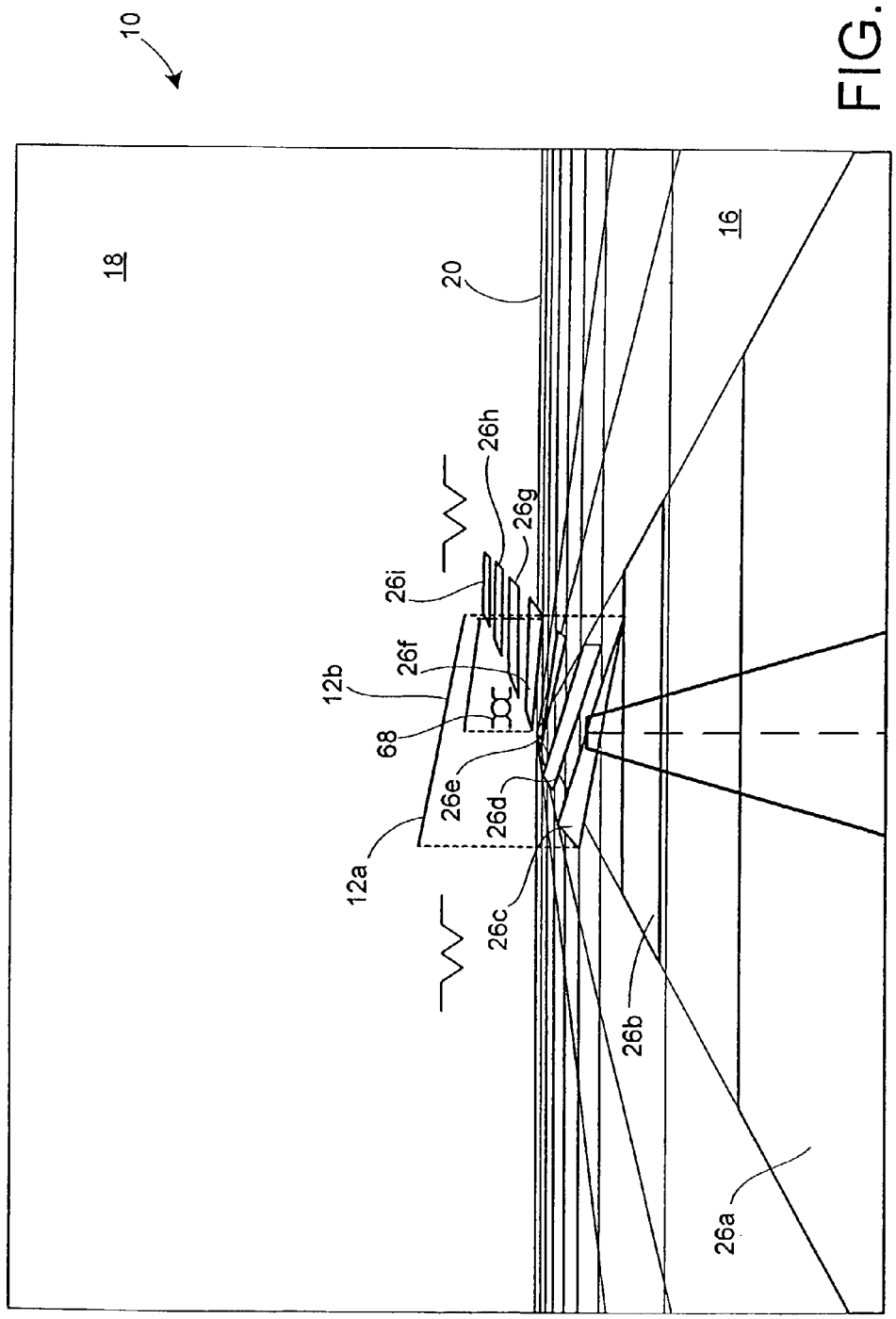
FIG. 1 is an illustration of a three dimensional airspace image resulting from use of the present invention.

A dynamic, three dimensional image 10 (FIG. 1) of airspace is displayed in accordance with the present invention to facilitate piloting an aircraft. The image includes a representation in three dimensions of upcoming sections of a selected flight path. In the illustrated preferred embodiment of the invention, the flight path is represented by a series of wickets 12a and 12b (preferably open rectangles) superimposed on a background representing the earth 16 and sky 18 meeting at an artificial horizon 20. Each wicket 12 frames a polygon (although other shapes may be used) that appears to lie in a vertical plane of the three dimensional airspace image, like a window frame through which the aircraft should fly. The flight path is also represented by a series of "pavers" 26a-26i which preferably are translucent polygons that follow the flight path. The pavers appear to lie in a horizontal plane of the three dimensional airspace image like stepping stones in the sky, appearing to recede toward the horizon. The wickets 12 and pavers 26 are generated by a program carried out by a computer (FIG. 2). The image may be updated 15 to 30 times a second, and so during flight, the wickets 12 and pavers 26 appear to approach from the distance and move to the front of the three dimensional airspace image, giving a visual impression of the aircraft flying through the wickets and along the length of the pavers, assuming the plane is flying according to the selected flight plan.

A system according to a preferred embodiment of the present invention is shown schematically in FIG. 2. The system includes a computer 52, a means 54 for the computer to acquire flight performance characteristics of the aircraft, means 56 for acquiring information concerning the aircrafts' position, altitude and heading, means 58 for providing the computer with flight plan information and means 60 for inputting new flight plan information. The computer has associated with it a memory 62 and a graphics processor 64 which controls a cockpit display 66.

The cockpit display 66 may be, for example, a cathode ray tube (CRT), a liquid crystal display screen, a gas plasma-based flat panel display, or other suitable display device.

The memory 62 may include both volatile and nonvolatile memory components. Volatile components are those that do not retain data values upon loss of power. Nonvolatile components are those that retain data upon a loss of power. Thus, the memory 62 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

When a pilot prepares for a flight according to the present invention, (s)he may enter the flight plan information 58 (FIG. 2) into a computer 52 for processing. The flight plan usually includes the starting airport or location, the destination airport or location, and waypoints which define the route to be followed and the assigned altitudes for each leg of the trip. The entered information may also include detailed departure information including runway assignments and departure procedures.

The computer 52 (FIG. 2) includes a set of instructions that generate a flight pathway. These flight pathway instructions may be loaded into the computer's processor from memory 62. The pathway generator logic, taking into account the particular aircraft involved and its flight characteristics as indicated at 54 and using conventional methodologies, preferably generates a curved, flyable path in three dimensions that conforms to the flight plan. This pathway information is stored in the memory 56 (FIG. 2). The computer 52 samples pathway information at regular intervals, and places wickets 12 and pavers 26 at the sampled locations along the pathway. This information is passed to the graphics processor 64 which generates the image of a three dimensional airspace, e.g., 10 in FIG. 1, for display on the cockpit display 66.

One boundary condition on the displayed image may be that the pathway does not include any flight path information below 200 feet altitude above ground level (altitude AGL). This limit may be imposed because at such a low altitude it is desirable for the pilot to watch the ground, not the cockpit display. Otherwise the initial pathway may include all the turns and elevation changes from takeoff to landing that were input by the pilot.

The three-dimensional airspace image generated from the pathway information is dynamic and is updated as the position of the aircraft changes with respect to the flight path. However, in order to reduce clutter in the displayed image, another boundary condition, termed a "clipping volume" may be imposed. The clipping volume extends from immediately in front of the aircraft to 3 miles in front of the aircraft. Wickets and pavers outside this volume preferably are not displayed because they are either too close to be of value to the pilot or too far ahead for present consideration.

Figure 2:
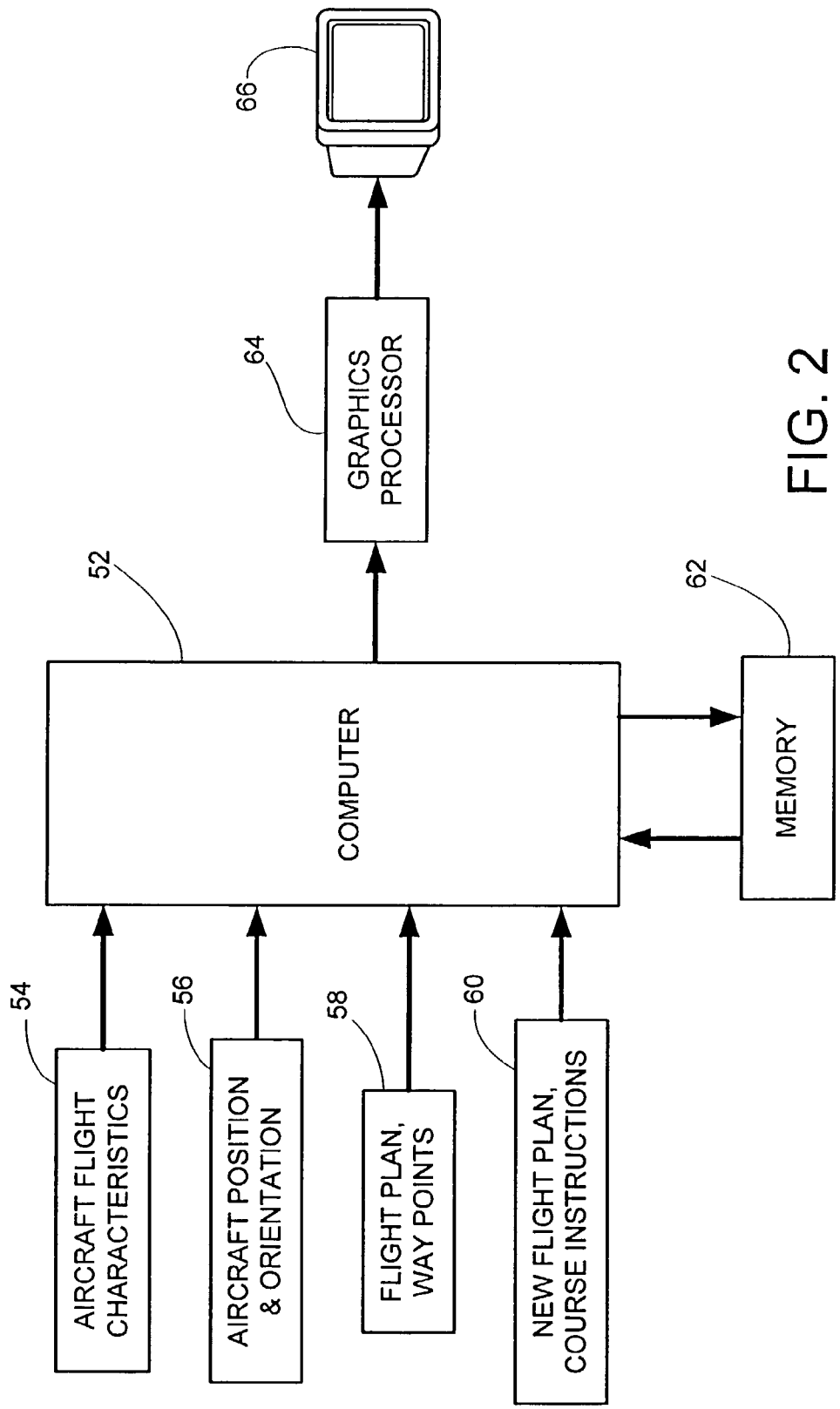
FIG. 2 is a schematic illustration of a computer system suitable for carrying out the present invention.

The display of wickets 12 and pavers 26 is especially useful in conjunction with a predictor 68 (FIG. 1). The predictor 68 is an image on the display representing the position where the aircraft will be at a moment a specified time interval in the future, assuming no changes are made to the flight controls. The length of time in front of the aircraft is a selectable time, being shorter for slower aircraft and longer for faster aircraft. For general aviation aircraft the predictor may be positioned about 5 to 20 seconds in advance of the aircraft, with 12 seconds in advance of the current position being particularly satisfactory. When the predictor 68 is included in the display, the pilot may navigate by maneuvering the aircraft so that the predictor lies within the wickets 12, following the road defined by the pavers 26.

The flight path is displayed as a series of wickets 12 and pavers 26 which appear in the sky of the three dimensional airspace image. The wickets 12 bracket the intended flight path; at lower altitudes it is typical for the flight plan to specify a vertical range of 150 feet above and below the specified elevation and horizontal range of about 300 to each side of the specified path. The 150 foot vertical tolerance and 300 foot horizontal tolerance are enlarged once a cruising altitude is reached. However, these margins may be adjustable according to any requirements of the flight that may be received from Air Traffic Control or imposed by the pilot. On approach to a landing, the flight path illustrated by the wickets 12 and pavers 26 can be made exactly the width of the runway.

The wickets 12 show the outer boundaries of flight path through space while the pavers trace the bottom of the vertical tolerance from the flight path. When approaching a wicket 12 head on, that is, perpendicular to the plane of the wicket, the desired flight path preferably is through the center of the wicket, above the paver 26. As noted above, the size of the wickets may be adjusted for various parts of the flight plan. For example, in the take off and landing portions the wickets are relatively smaller, reflecting the need for careful navigation at these points of the flight. Once at cruising altitude, however, the wickets may be opened up to allow for more deviation from the centerline of the flight path.

The wickets 12 are positioned on the display to guide the pilot. The wickets 12 are presented in the three dimensional image in a way that provides information to the pilot concerning the proper attitude and roll of the airplane. The wickets 12 appear higher in the sky 18 than the bug 68 when the aircraft should climb to reach the desired flight path and lower in the sky if the aircraft should be descending.

The wickets 12 and pavers 26 also change shape to suggest changes in the direction of the flight path. In a preferred embodiment, the wickets 12 appear as rectangles when the flight path is perpendicular to the apparent plane of the wickets. However, where the aircraft should be turning, the succession of wickets moves to the right or left (as appropriate) and further may be distorted into parallelograms to indicate the appropriate degree of roll for the aircraft. For example wickets 12a and 12b in FIG. 1 illustrate an upcoming right hand turn. These wickets 12a and 12b have vertical sides, but their top and bottom edges are slanted with respect to the artificial horizon 20, indicating to the pilot that the aircraft should bank in order to make the turn. Similarly, the pavers, like paver 26e, are tapered into trapezoids to mark a turn.

The system preferably places the wickets 12 and pavers 26 so that a constant time interval occurs between each at the aircraft's ground speed. For example, the wickets 12 and pavers 26 may be five seconds apart, which for an aircraft flying at 264 feet per second means that the wickets and pavers are spaced apart 1320 feet. Typically the system is set to generate two pavers 26 for each wicket 12, so the pavers would pass every 2.5 seconds in this example. If the aircraft's speed changes, the spacing between the wickets and pavers also changes so that the pavers 26 appear to pass by at the same rate, in this example every 2.5 seconds. It has been found through experimentation that when the pavers 26 appear to go by in the image every 1 to 5 seconds the pilot has a satisfactory sensation of movement. If the pavers pass by more frequently, they become a distracting blur to the pilot, and if they are too infrequent, the pilot does not get a sufficient impression of movement from viewing the display.

If the aircraft strays from its flight plan by dropping below the apparent elevation of the pavers 26, that is, below the selected vertical margin of error (in the example, 150 feet), the pavers disappear from the screen. This is a visual indication for the pilot that he should ascend. When the aircraft regains sufficient altitude, the pavers reappear on the screen.

One or more of the wickets 12 may include an indication of the direction the aircraft is supposed to fly through the wicket. Ordinarily there is not much need for this information because flying from one wicket to the next starting at takeoff naturally produces flight in the correct direction. Yet there are times, especially if the pilot has made an unanticipated turn and is returning to the flight path after such an unexpected deviation that it may not be immediately evident what direction to go. The indication on the wicket of intended direction can assist the pilot to avoid misdirected flight. For this reason some or all of the wickets 12 may have a top cross bar 70 (FIG. 4) that includes an arrow 72 pointing in the direction of intended flight. Of course there are other shapes that could serve the purpose as well. The cross bar 70 which marks the top of the wicket may be removed entirely in favor of just the lines marking the front edges of the arrow 72, or different arrows or the like could be made to appear to extend in the desired direction, either floating in space, like a paver, or attached to a wicket.

As the aircraft's position changes, its new position is determined by conventional means 80 such as from GPS data and/or from an inertial guidance system, and this information is sent to the computer 52. The computer calculates the changes in position compared to the previous position and the flight path. The resulting information is passed to a graphics processor that produces a new three-dimensional display showing the wickets 12 and pavers 26 in their new positions relative to the aircraft. As the aircraft advances, new wickets and pavers are displayed, appearing first in the apparent distance and then moving toward the foreground of the three-dimensional airspace image as the aircraft advances along the flight path.

The pathway generator may regenerate the pathway as required during the flight or even before. For example, if the departure information is not available at the time the initial pathway is generated, that information may be added later and the pathway re-generated to include this information prior to take off. During flight, the pilot may, for one reason or another, change course. (S)he may do so to avoid weather or because of an Air Traffic Control instruction. Further, the pathway may be updated because of the addition of arrival and/or approach information. A pilot may not have an assigned runway at the time of takeoff, or the assigned runway or approach flight plan may change between the time the flight plan is initially prepared and the time the destination is approached. In this case the new information is entered into the computer at 60 and a new pathway is generated. In such a situation the system takes as its then "starting point" not the airport of origination, but the airplane's current operating condition (current location and orientation) obtained from input means 56. The system then generates new pathway connecting the present location with the desired end point. Whenever the pathway is updated, the program provides the new pathway with a first segment which is, for example, a 5 to 30 second continuation of the current flight path.

The length of this continuation path depends on a number of variables. The time should be long enough for the computer to generate a new flight path and for the graphics processor to generate the necessary wickets and pavers. It should also leave time after the display is updated for the pilot to react, and it should take into account the flight performance characteristics of the particular aircraft, since the flight path should not suggest the pilot make a maneuver that the aircraft cannot perform comfortably. This initial segment assures that the system takes all these considerations into account. Experiments have shown that a delay of 5 to 30 seconds before any change of course is required is generally sufficient, depending on the aircraft and its speed.

Figure 4:
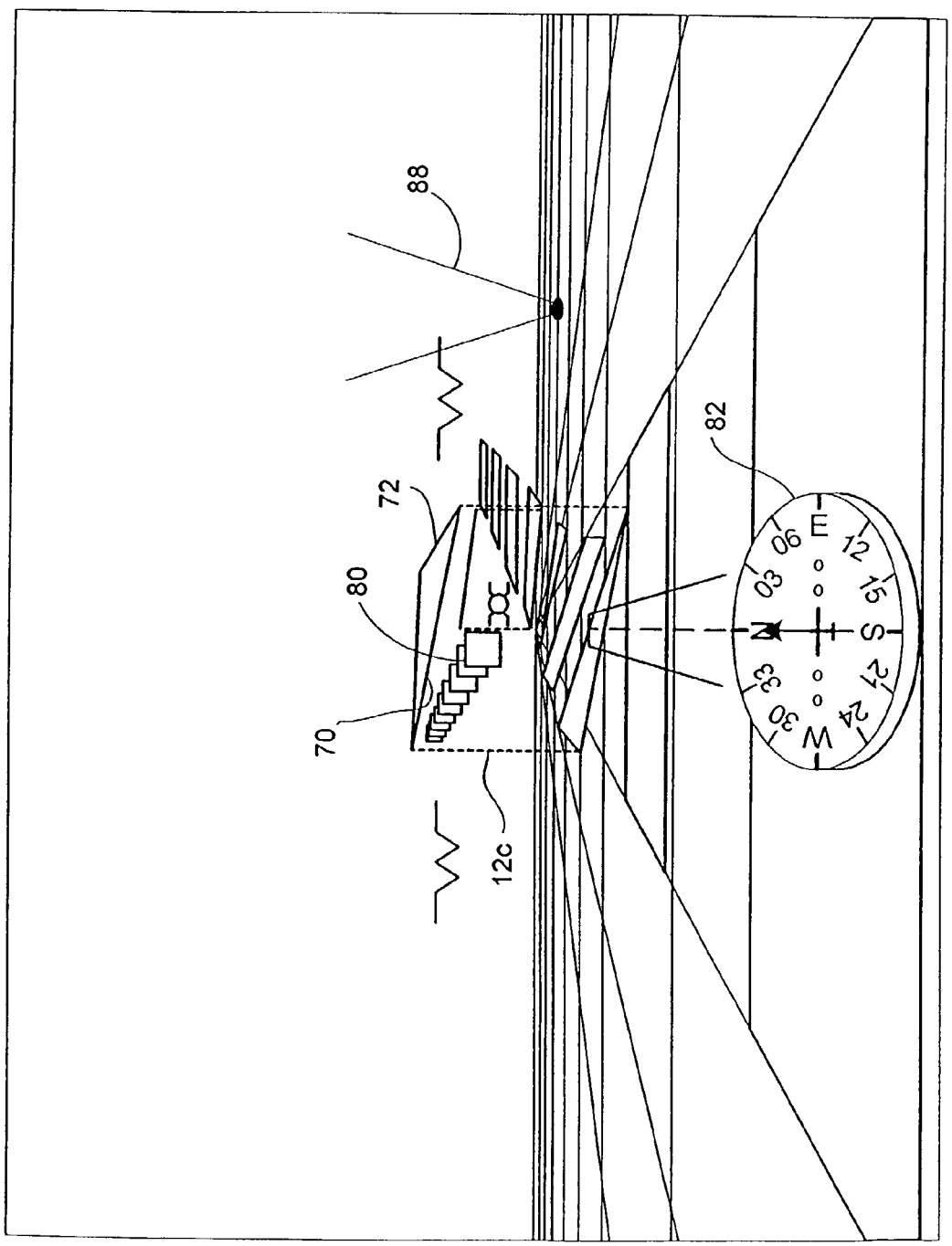
FIG. 4 is an illustration of a three dimensional airspace display that includes a compass rose resulting from the use of the present invention.

The system according to the present invention also enables a pilot to view a three-dimensional plot of a requested course change before executing it. When a course change becomes necessary, the pilot may enter the new instructions into the system's computer. The system than immediately projects the requested course change on the airspace display in a characteristic form, e.g., a series of small, square wickets 80. (FIG. 4.) The pilot can then see the planned new course in the display, and he is provided with an opportunity to accept the planned course change. The pilot could, for example, reject the proposed course change if it leads to airspace which is forbidden or appears to lead to hazardous conditions. This is especially useful when the display also includes information about surrounding geography, obstacles, and/or weather. If the proposed change is not accepted by an affirmative entry by the pilot, the system removes the proposed course, leaving only the preexisting flight path. If the pilot does accept the new course, then the small boxes are replaced by pavers and wickets to guide the way. While the tentative course is described as appearing as a series of small squares 80, obviously other representations are possible: a tapering solid line of a distinctive color, could be used, a pair of lines that approach each other but appear parallel in the three dimensional airspace image could be used, as could closed geometric figures such as triangles, half moons etc. It is preferable that they at least be distinctive and allow the pilot to immediately see the proposed change in the image if the three dimensional airspace in which the aircraft is flying.

The present invention further contemplates a compass rose 82 (FIG. 4) displayed as part of the three-dimensional airspace display. The compass rose 82 is generated by providing heading information to the computer together with information describing a conventional, two-dimensional compass rose. This compass rose 82 is assigned a thickness, and that information is then transferred to the graphics processor 69 which rotates the image so that the compass rose appears to lie approximately in the plane of the ground in the three-dimensional airspace display.

In addition various landmarks may be made to appear in the airspace image. These landmarks may include radio beacons 88 used for navigation, airport runways, political boundaries, and the like. The presence of these landmarks can assist the pilot in choosing his course and staying on it. Further the present invention may be used in connection with a synthetic display of the terrain below the aircraft. This display may be created in accordance with the procedures described in a United States patent application filed concurrently herewith and entitled System and Method For Synthetic Flight Display, the entire disclosure of which is incorporated herein by reference.

Although the logic 90 (FIG. 3) of the present invention is embodied in software or code executed by general purpose hardware as discussed above, as an alternative the logic 90 (FIG. 3) may also be embodied in dedicated hardware or a combination of software/general purpose hardware and dedicated hardware. If embodied in dedicated hardware, the logic 90 (FIG. 3) can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

Figure 3:
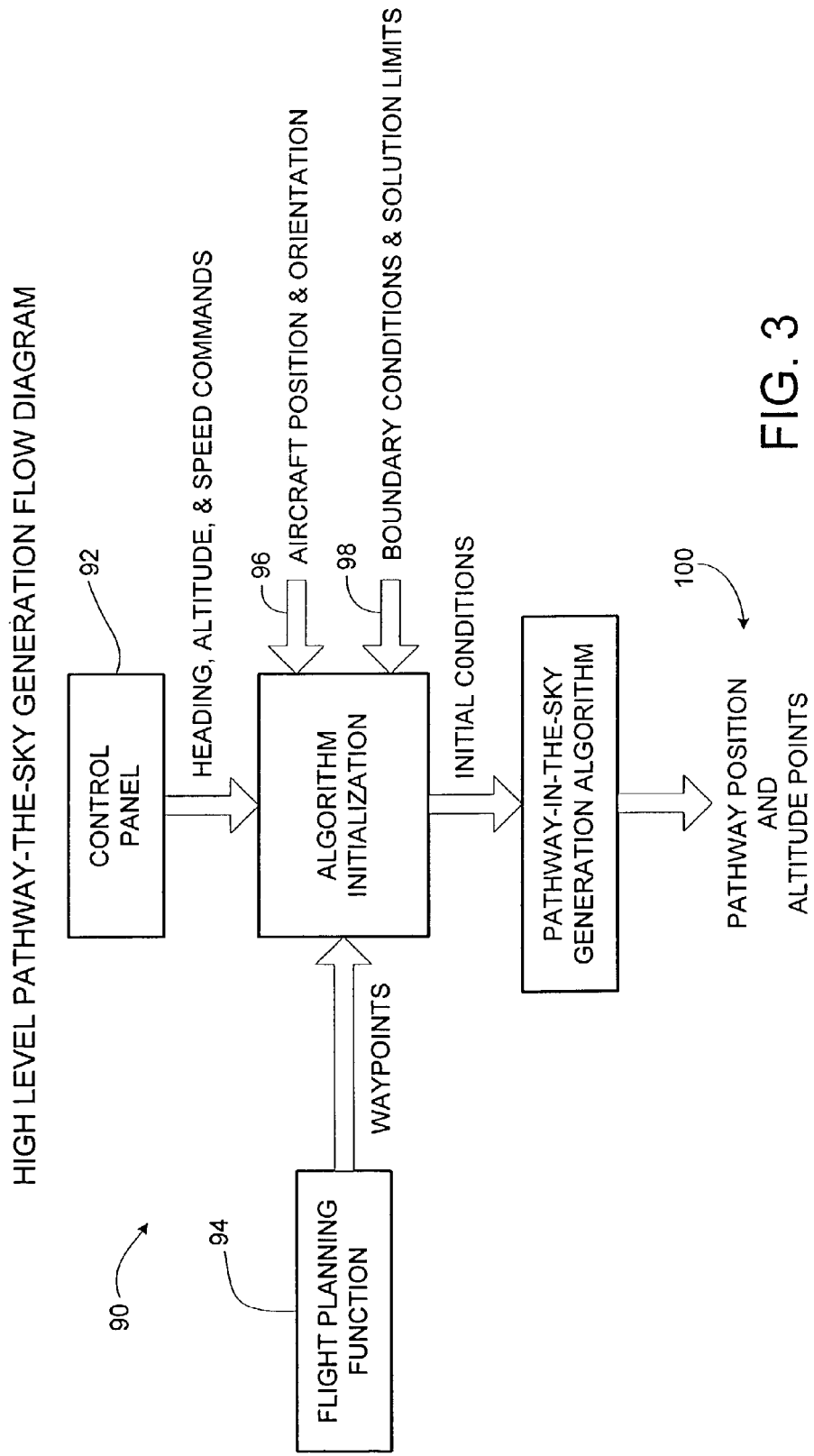
FIG. 3 is a flow diagram illustrating the process of generating a flight pathway from various input parameters.

The block diagram and/or flow chart of FIG. 2 shows the architecture, functionality, and operation of an implementation of the logic 90 (FIG. 3). If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the block diagram and/or flow chart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention. Also, the block diagram and/or flow chart of FIG. 3 is relatively self-explanatory and are understood by those with ordinary skill in the art to the extent that software and/or hardware can be created by one with ordinary skill in the art to carry out the various logical functions as described herein.

Also, where the logic 90 (FIG. 3) comprises software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the logic 90 (FIG. 3) for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention has been shown and described with respect to certain preferred embodiments, equivalent alterations and modifications will occur to others skilled in the art upon reading and understanding this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

What is claimed is:

1. A method of presenting flight path information for an aircraft in a three-dimensional airspace display, said method comprising the steps of receiving flight plan data;

receiving aircraft performance data;

processing the data to form a selected flight path, the selected flight path including a starting point, at least one waypoint, and a destination;

generating first and second symbols along a current portion of the selected flight path that includes the at least one waypoint in response to the selected flight path, the first symbols showing boundaries around the current portion of the selected flight path, the second symbols following the current portion of the selected flight path without change made to flight controls, and displaying the first and second symbols in a three dimensional airspace display.

2. The method of claim 1 further including the step of receiving data describing the present position of the aircraft, and the step of displaying the symbols includes the step of updating and displaying the symbols from the point of view of the present position of the aircraft.

3. The method of claim 1 wherein one of the first and second symbols are parallelograms.

4. The method of claim 1 wherein the first symbols define a series of targets through which the aircraft should fly in order to follow the flight plan.

5. The method of claim 4 wherein the first and second symbols appear spaced apart uniformly in the three-dimensional airspace display.

6. The method of claim 5 wherein the first and second symbols appear uniformly spaced apart a distance in the three-dimensional airspace display that is dependent on the ground speed of the aircraft.

7. The method of claim 1 further including the step of receiving data describing the present position of the aircraft, and the step of displaying the symbols includes the step of displaying the symbols from the point of view of the present position of the aircraft, wherein the first symbols define a series of targets through which the aircraft should fly in order to follow the flight plan.

8. The method of claim 1 further including the step of displaying a compass rose in the three dimensional air space display, the compass rose being displayed so as to appear to lie approximately in a horizontal plane below the present position of the aircraft.

9. The method of claim 2 further including the step of displaying a compass rose in the three dimensional air space display, the compass rose being displayed so as to appear to lie approximately in a horizontal plane below the present position of the aircraft.

10. The method of claim 1 wherein the step of receiving flight plan data includes including receiving data corresponding to an initial flight plan, processing the data to form first flight path data, and thereafter receiving data corresponding to a second flight plan and to the aircraft's current position, processing the second flight plan data to form a second flight path which begins at the aircraft's current position, the second flight path including an initial segment that is an unaltered continuation of the initial flight plan.

11. The method of claim 3 wherein the second symbols are a parallelopipeds, and the step of displaying the first and second symbols includes the step of displaying the second symbols as a series of parallelopipeds lying in a plane parallel to the plane of the selected flight path in the three dimensional air space display.

12. The method of claim 1 wherein the second symbols appear to lie in the plane of the selected flight path.

13. The method of claim 12 wherein the step of displaying the first and second symbols produces first symbols which appear to lie in a plane perpendicular to the selected flight path.

14. The method of claim 1 further including updating the first and second symbols by enlarging said first and second symbols.

15. A method of presenting flight path information for an aircraft in a three-dimensional airspace display, said method comprising the steps of receiving flight plan data, receiving aircraft performance data, processing the data to form selected flight path data, generating first and second symbols in response to the selected flight path data, the first symbols showing boundaries around the selected flight path, the second symbols following the selected flight path, and displaying the first and second symbols in a three dimensional airspace display, further including the step of receiving data describing the present position of the aircraft, and the step of displaying the symbols includes the step of displaying the symbols from the point of view of the present position of the aircraft, wherein the first symbols define a series of targets through which the aircraft should fly in order to follow the flight plan, wherein the first symbol is a parallelogram, and the step of displaying the symbols from the point of view of present position of the aircraft includes varying the length of the sides of the parallelogram and the angles included between the sides of the parallelograms.

16. The method of claim 15 wherein the first and second symbols are uniformly spaced apart a distance in the apparent three-dimensional airspace display that is dependent on the ground speed of the aircraft.

17. The method of claim 16 further including the step of displaying a compass rose in the three dimensional air space display, the compass rose being displayed so as to appear to lie approximately in a horizontal plane below the present position of the aircraft.

18. A program stored on a computer readable medium for presenting selected flight path information for an aircraft in a three-dimensional airspace display, including code that defines data categories for flight plan data, code that defines data categories for aircraft performance data, code that processes the data to form selected flight path data, code that generates for display first and second symbols in response to the selected flight path data, the first symbols showing boundaries around the selected flight path, and the second symbols following the selected flight path without change made to flight controls.

19. The program of claim 18 including code that updates and displays the first and second symbols from the point of view of the present position of the aircraft.

20. The program of claim 19 including code that displays the first and second symbols at uniformly spaced apart distances in the three dimensional airspace display.

21. The program of claim 20 including code that displays a compass rose in nearly a horizontal plane of the three dimensional airspace display.

22. A system for presenting flight path information for an aircraft in a three-dimensional airspace display, said system including a computer, said computer adapted to receive flight plan data and aircraft performance data, said computer adapted to process the data to form a selected flight path, the selected flight path including a starting point, at least one waypoint, and a destination, said computer adapted to generate first and second symbols along a current portion of the selected flight path that includes the at least one waypoint in response to the selected flight path, the first symbols showing boundaries around the current portion of the selected flight path, the second symbols following the current portion of the selected flight path without change made to flight controls, and a display unit, said display unit adapted to display the first and second symbols in a three dimensional airspace display.

23. The system of claim 22 wherein said computer is adapted to receive data describing the present position of the aircraft, and wherein said display unit displaying the symbols from the point of view of the present position of the aircraft.

24. The system of claim 22 wherein one of the first and second symbols are parallelograms.

25. The system of claim 22 wherein the first symbols define a series of targets through which the aircraft should fly in order to follow the flight plan.

26. The system of claim 25 wherein the first and second symbols appear spaced apart uniformly in the three-dimensional airspace display.

27. The system of claim 26 wherein the first and second symbols appear uniformly spaced apart a distance in the three-dimensional airspace display that is dependent on the ground speed of the aircraft.

28. The method of claim 22 wherein said computer is adapted to receive data describing the present position of the aircraft, and wherein said display displaying the symbols from the point of view of the present position of the aircraft.

29. A method of presenting flight path information for an aircraft in a three-dimensional airspace display, said method comprising the steps of receiving flight plan data, receiving aircraft performance data, processing the data to form selected flight path data, generating symbols in response to the selected flight path data, and displaying the symbols in a three dimensional airspace display, wherein the step of receiving flight plan data includes receiving data corresponding to an initial flight plan, processing the data to form first flight path data, and thereafter receiving data corresponding to a second flight plan, processing the second flight plan data to form second flight path data which begins at the aircraft's current position, generating symbols in response to the second flight path data, and displaying the symbols in a three dimensional airspace display.

30. A method as set forth in claim 29 wherein the second flight path data includes an initial segment that is an unaltered continuation of the initial flight plan.

31. A method of presenting flight path information for an aircraft on a display illustrating a three-dimensional airspace view, said method comprising the steps of receiving flight plan data, receiving aircraft performance data, processing the data to form selected flight path data, generating symbols in response to the selected flight path data, the symbols showing boundaries around the selected flight path and at least one of the symbols having associated therewith an indicator of the direction through which the aircraft should pass through the boundary depicted by the at least one of the symbols, and displaying the symbols on said display in a three dimensional airspace view.

32. A method of presenting flight path information for an aircraft in a three-dimensional airspace display, said method comprising the steps of:
receiving flight plan data;
receiving aircraft performance data;
processing the data to form a selected flight path, the selected flight path including a starting point, at least one waypoint, and a destination;
generating first and second symbols along a portion of the selected flight path that includes the at least one waypoint in response to the selected flight path, the first symbols showing boundaries around the current portion of the selected flight path, the second symbols following the current portion of the selected flight paths;
generating a third symbol in response to aircraft movement, the third symbol showing future aircraft position assuming no change made to flight controls; and
displaying the first, second and third symbols in a three dimensional airspace display.

33. The method of claim 32 including maneuvering the aircraft so that the third symbol moves toward the first and second symbols.

34. A program stored on a computer readable medium for presenting selected flight path information for an aircraft in a three-dimensional airspace display, including code that defines data categories for flight plan data, code that defines data categories for aircraft performance data, code that processes the data to form a selected flight path, the selected flight path including a starting point, at least one waypoint, and a destination, code that generates for display along a current portion of the selected flight path that includes the at least one waypoint first and second symbols in response to the selected flight path, the first symbols showing boundaries around the current portion of the selected flight path, and the second symbols following the current portion of the selected flight path, and code that generates a third symbol in response to aircraft movement, the third symbol showing future aircraft position assuming no change made to flight controls.

35. A system for presenting flight path information for an aircraft in a three-dimensional airspace display, said system including a computer, said computer adapted to receive flight plan data and aircraft performance data, said computer adapted to process the data to form a selected flight path, the selected flight path including a starting point, at least one waypoint, and a destination, said computer adapted to generate first and second symbols on the display along a current portion of the selected flight path that includes the at least one waypoint in response to the selected flight path data, the first symbols showing boundaries around the current portion of the selected flight path, the second symbols following the current portion of the selected flight path, said computer adapted to generate a third symbol on the display in response to aircraft movement, the third symbol showing future aircraft position assuming no change made to flight controls and a display unit, said display unit adapted to display the first and second symbols in a three dimensional airspace display.

36. A system for presenting flight path information in an aircraft, said system comprising:
a computer adapted to receive flight plan data and process the data to form a selected flight path and to generate a series of polygons in response to the selected flight path, the polygons showing boundaries around the selected flight path at a pilot-selectable range from the selected flight path; and
a display unit adapted to display the series of polygons in a three dimensional airspace display at the selected range, said display unit positioning said series of polygons in said three-dimensional airspace display such that the selected flight path passes through an interior of the polygons.

37. The system of claim 36 wherein said display unit is further adapted to display a compass rose on said display unit simultaneous with the display of said polygons.

38. The system of claim 37 wherein said display unit is further adapted to synthetically display images of terrain below the aircraft in three dimensions.

39. The system of claim 38 wherein said display unit is further adapted to display a predictor indicating a prediction of where the aircraft will be at a future moment in time.

40. The system of claim 38 wherein said pilot-selected range includes at least one of a vertical and a horizontal range.

41. A method of presenting flight path information for an aircraft in a three-dimensional airspace display, said method comprising:
receiving flight path data selected by a pilot, said flight path data including a range for a selected flight path; and
displaying on an aircraft cockpit display a three-dimensional airspace display that includes a series of polygons showing boundaries around the selected flight path at said range, said polygons positioned in said three-dimensional airspace display such that the selected flight path passes through an interior of the polygons.

42. The method of claim 41 further including displaying on the aircraft cockpit display a predictor indicating a prediction of where the aircraft will be at a future moment in time.

43. The method of claim 42 further including displaying on the aircraft cockpit display a three-dimensional synthetic display of the terrain below the aircraft.

44. The method of claim 43 further including displaying on the aircraft cockpit display a compass rose simultaneous with the display of said polygons.

45. The method of claim 44 wherein said range includes both a vertical range and a horizontal range.

46. A method of presenting flight path information for an aircraft in a three-dimensional airspace display, said method comprising:

receiving flight path data selected by a pilot, said flight path data defining a selected flight path;

displaying on an aircraft cockpit display a three-dimensional airspace display that includes a series of open parallelograms showing boundaries around the selected flight path, said open parallelograms positioned in the three-dimensional airspace display such that the selected flight path passes through an interior of the open parallelograms;

displaying on the aircraft cockpit display a predictor indicating a prediction of where the aircraft will be at a future moment in time;

displaying on the aircraft cockpit display a three-dimensional synthetic display of the terrain below the aircraft; and displaying on the aircraft cockpit display a compass rose.

47. The method of claim 46 further including positioning said series of parallelograms about said selected flight path at a pilot-selectable range.

48. The method of claim 47 wherein said pilot-selectable range includes both a vertical component and a horizontal component.

49. A method of presenting flight path information for an aircraft in a three-dimensional airspace display, said method comprising:

receiving flight path data selected by a pilot, said flight path data defining a selected flight path;

displaying on an aircraft cockpit display a three-dimensional airspace display that includes a series of open parallelograms showing boundaries around the selected flight path, said open parallelograms positioned in the three-dimensional airspace display such that the selected flight path passes through an interior of the open parallelograms;

displaying on the aircraft cockpit display a predictor indicating a prediction of where the aircraft will be at a future moment in time; and changing a shape of said parallelograms to indicate a desired degree of roll for the aircraft when passing through said parallelograms.

50. The method of claim 49 wherein said changing of a shape of said parallelograms includes changing angles at corners of said parallelograms.

51. The method of claim 50 further including:

displaying on the aircraft cockpit display a three-dimensional synthetic display of the terrain below the aircraft; and displaying on the aircraft cockpit display a compass rose.

* * * * *

UNITED STATES PATENT AND TRADEMARK OFFICE
CERTIFICATE OF CORRECTION

PATENT NO. : 7,505,835 B2　　　　　　　　　　　　　　　　　　　　　　　Page 1 of 1
APPLICATION NO. : 10/189814
DATED : March 17, 2009
INVENTOR(S) : Clifford S. Brust et al.

It is certified that error appears in the above-identified patent and that said Letters Patent is hereby corrected as shown below:

Column 4
Line 46, insert --the-- between "boundaries of" and "flight path"

Column 11
Claim 32, Line 55, "paths;" should be --path;--

Column 12
Claim 35, Line 22, delete --data-- after "path"

Signed and Sealed this

Twelfth Day of May, 2009

JOHN DOLL
*Acting Director of the United States Patent and Trademark Office*